UNITED STATES PATENT OFFICE.

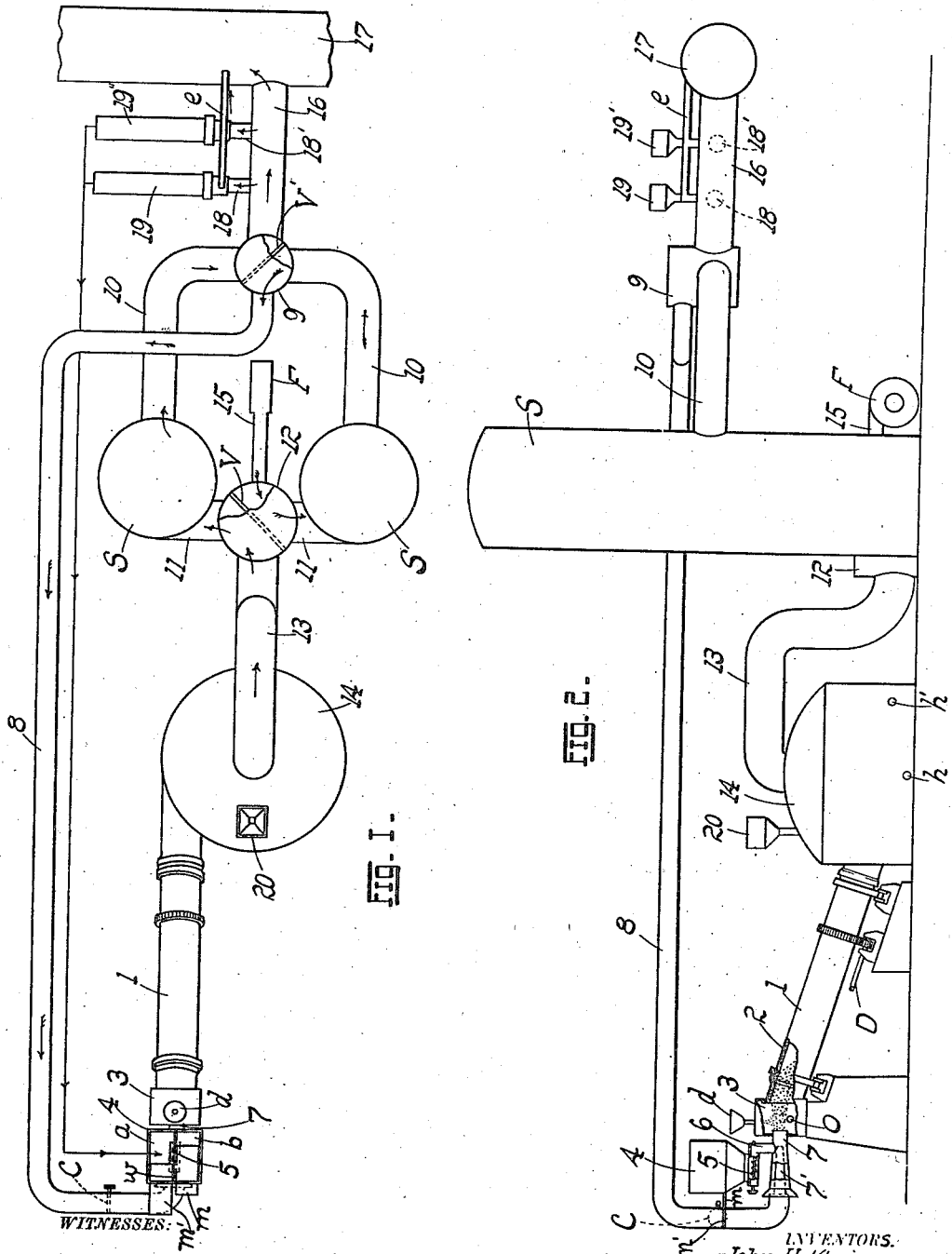

JOHN H. KLEPINGER, MILO W. KREJČI, AND CHARLES R. KUZELL, OF GREAT FALLS, MONTANA.

PROCESS OF SMELTING ORES.

1,160,621.  Specification of Letters Patent.  Patented Nov. 16, 1915.

Application filed January 21, 1915. Serial No. 3,539.

*To all whom it may concern:*

Be it known that we, JOHN H. KLEPINGER, MILO W. KREJČI, and CHARLES R. KUZELL, citizens of the United States, residing at Great Falls, in the county of Cascade and State of Montana, have invented certain new and useful Improvements in Processes of Smelting Ores, of which the following is a full, clear, and exact description, reference being had to the accompanying drawings, forming a part hereof.

Our invention has relation to improvements in processes of smelting ores; and it consists in the novel features more fully set forth in the specification and pointed out in the claims.

The present invention is directed to the smelting and reduction of ores and metallic oxids generally, and particularly to the treatment of material in which the metal is in the form of oxid, carbonate, silicate or other equivalent form reducible by the action of carbon or equivalent reducing reagent.

The improved process is specially applicable to the smelting and reduction of ores and metallic oxids which are in a finely divided condition and which can not advantageously be treated in either a blast or reverberatory furnace. Ores in a finely comminuted condition do not readily lend themselves to treatment in a blast furnace because they either pack and thus prevent a free percolation of the gases therethrough, or the fine particles are carried out of the furnace by the gases; and they are difficult of treatment in a reverberatory furnace on account of their tendency to pack, thus preventing the reaction gases from gaining access to the individual particles of the ore, the reaction being confined to the surface of the charge only. Where fine material and dust are fed to a fuel-fired smelting furnace of the reverberatory type, there results more or less bedding or piling up of the material in the furnace in such a manner that only those particles which lie on the outside of the bed are directly exposed to the influence of the heating medium which is usually the gases of combustion of the fuel. Furthermore, even in these particles their entire surface is not directly exposed due to the contact of each particle with adjacent particles. It follows therefore that the efficiency of the transfer of heat from the heating medium to the particles to be smelted is not as high as it would be if each particle were, immediately upon entering the furnace, completely surrounded by the heating medium.

The object of the present invention therefore is to completely surround each particle as it enters the furnace chamber, with the heating medium, whereby the necessary reaction between it and said medium may take place with a view of bringing about the rapid reduction and smelting of the material contemplated by our invention.

The invention is not restricted to the treatment of any one ore, being applicable to any oxidized ore (or metallic oxid) requiring a reducing process, examples of which may be cited ores of iron, copper, lead, zinc, the process making it possible to treat economically the "fines" of these ores. These fines may be dust, or finely comminuted material resulting from the grinding of the ore and which is now generally treated in conjunction with coarser particles in furnaces specially adapted for treating coarse material. In practising the process we are not restricted to the use of any particular apparatus, as this may be varied according to circumstances and local conditions, the nature of the ore, the character of the fuel and the like, but in order that the process may be readily comprehended we illustrate conventionally one form of apparatus the details of which will be described in connection with the invention proper.

The advantages of the process will be apparent from the following detailed description of the invention considered in connection with the drawing aforesaid, in which—

Figure 1 is a diagrammatic top plan view of an apparatus in which our process may be carried on; and Fig. 2 is a diagrammatic side elevation of the same, some of the parts being represented more or less conventionally.

Referring to the drawings, 1, represents an inclined revolving cylinder lined with fire-brick or equivalent refractory material 2, the interior of said cylinder serving as a combined combustion, treatment and reducing chamber. The said cylinder is driven from a shaft D, and is herein shown more or less conventionally, being similar in construction to a cylindrical cement kiln used in the production of cement clinker, but differing therefrom in the manner of introducing the charge, the ore and fuel in the present instance being introduced at the elevated end whereas in the cement practice the fuel is introduced at the low end of the cylinder. In the cement practice too, the fuel end is the point of discharge of the clinker, while the opposite or high end serves both for the introduction of the raw material as well as an exit for the gases due to the combustion of the fuel used.

In our invention the low end of the cylinder serves as a discharge for the smelted material and as an exit for combustion and reaction gases. In the present embodiment of our invention the upper end of the revolving cylinder communicates with a casing 3 forming an igniting chamber which may be considered as a part of the treatment or combustion chamber of the cylinder 1, the casing having an opening O for the insertion of an igniting torch; and in the present instance being provided with a hopper $d$ for the introduction of molten converter slag or other equivalent form of fluxing material should the same be found necessary to be added to the charge treated in the cylinder 1. Disposed adjacent the casing 3 is a hopper 4 preferably divided into two contiguous compartments $a$, $b$, by a division wall $w$, the compartment $a$ being charged with fine ore or oxid, and the compartment $b$ being charged with powdered reduction fuel or coal, the materials being jointly conducted by a screw-conveyer 5 through a down-take 6 into the mixing chamber 7 across the path of discharge of the blast nozzle (or nozzles) 7' through which air (or other gas) under pressure is delivered by a hot air flue or conduit 8 leading from a distributer or valve-casing 9, the flue being provided with a controlling valve C of any well known type. Communicating with the casing 9 through the conduits 10, 10, are suitable preheating stoves S, S, into which discharge the short pipes or conduits 11, 11, from a distributer or valve-casing 12, the latter receiving through the flue 13, the waste gases from the settling chamber 14 into which the contents of the treatment cylinder 1 are directly discharged. The settling chamber is connected to the cylinder 1 as shown, receiving therefrom not only the reaction and combustion gases generated therein, but also the molten metal and slag (if any) formed in the cylinder, the metal collecting in the chamber being withdrawn through the bottom tap hole $h$, and the slag through the upper tap hole $h'$, the gases escaping through the waste gas flue 13, as fully indicated in the drawings. The air is preheated in one or the other of the stoves S, being forced into the distributer casing 12 by a fan, pump, or blower F, through the conduit 15, and thence into the stove, the casing 12 being provided with a suitable valve or damper V to direct the air into one stove while directing the hot waste gases from the flue 13 to the other stove, the damper being manipulated so as to utilize the absorbed heat first of one stove and then the other for heating the incoming air, while the other stove is being heated by the waste gases. The air thus preheated passes into the distributer casing 9 provided with a similar damper or valve V', which directs the heated air into the hot air flue 8 (whence it passes into the nozzle or nozzles 7'), the hot waste gases coming from the other stove being diverted into the waste gas flue 16, and main 17. By reversing the valves V, V', the paths of the cold air and hot gases from the flue 13 are reversed, that is to say, the stove which was traversed by the hot gases is now traversed by the cold air, and the stove traversed by the cold air is now traversed by the hot gases, the casing 9 always delivering heated air to the flue 8, and hot waste gases to the flues 16, 17, one of the conduits 10 serving as an air conduit, while the other serves as a gas conduit. The flue 16 is provided with shunts or branches 18, 18', leading to driers 19, 19', respectively which may contain the ore and fuel charge respectively, the dried charges being subsequently conveyed to their respective compartments $a$, $b$, of the hopper 4. Leading from the driers is a common waste pipe $e$ discharging into the main 17. The settling chamber 14 may be provided with a hopper 20 for introducing flux or other material if desired, to maintain the layer of slag floating on top of the metal in the chamber, in a proper molten condition, and to protect the bottom layer of metal.

It will be seen from the drawings (Fig. 1) that the discharge of the gases and molten material from the cylinder 1 is at a tangent to the walls of the settling chamber, this arrangement being desirable to prevent scattering of the particles and their being carried over into the waste gas flue 13 and casing 12. By causing the gases and molten particles to enter at a tangent the same are caused to hug the walls of the settling chamber and scattering or dispersion thereof is avoided. The settling chamber may if desired be provided with suitable heating apparatus (not shown) to maintain a high temperature therein, a matter determined by the character and specific heat of the material discharged thereinto.

In the present embodiment of our invention the blast nozzle (or nozzles) 7 by which the ore and fuel are projected into the chamber of the casing 3 and consequently into the treatment chamber of the cylinder 1, is set to discharge at an angle to the axis of the cylinder, so that the material is projected against the inner surface of the upper peripheral wall of the cylinder, this arrangement subserving a twofold object, to-wit—(1) it lessens the possibility of fine unsmelted particles being carried into the smelting chamber, the impact of the particles against the cylinder walls causing scattering and thorough intermixture between the various components of the charge (ore, fuel and flux) so that the hot gases of combustion will be certain to envelop the ore and flux particles to be smelted, and cause a thorough fusion of the same either before they find their way into the cylinder, or while they are traversing the cylinder chamber (treatment chamber), and (2) it serves to lengthen the life of the refractory lining of the cylinder as the stream of smelting material will continually impinge at different points of the lining as a result of the rotation of the cylinder about its axis. The oblique disposition of the axis of the nozzle 7 (there may be one or more nozzles) to the axis of the cylinder of course is not absolutely indispensable, and in some cases the nozzles may be set parallel to the cylinder axis, in which event the projection of the material will be in the general direction of such axis. The nozzle or nozzles 7 have the effect of projecting the ore and fuel in the form of a spray or cloud so that each ore particle will be enveloped (with the burning of the fuel) with a hot reaction gas at a proper temperature to effect reduction and fusion of the ore, it being understood that a reducing atmosphere is maintained in the chamber of the casing 3 and in the treatment chamber of the cylinder 1 to effect not only reduction of the oxids but fusion of the metal resulting from such reduction. This reducing atmosphere may be attained by introducing solid (or liquid) fuel in excess in conjunction with a proper complement of air, which may be either preheated as here described, or cold if desired; or it may be brought about by using (in lieu of solid or liquid fuel) a reducing gas to operate on the ore (or oxid), examples of such gas being producer gas or equivalent gases of a reducing nature. We may even substitute a fire box to generate the heating gases to act on the spray or cloud of ore (or oxid), as will be apparent to the skilled metallurgist.

In the present embodiment of apparatus we illustrate but one blast nozzle 7 to spray the ore and fuel conjointly into the treatment chamber, the two materials mixing more or less before the same are projected into the treatment chamber, but we do not wish to limit ourselves to this arrangement, as it is obvious that the ore and fuel might be projected independently and by separate nozzles, the object sought being of course to secure as thorough intermingling thereof as possible in the treatment chamber to insure the enveloping of each ore (or oxid) particle by the gases of combustion of the carbon (or equivalent) fuel employed. It follows therefore that many changes falling within the purview of the skilled metallurgist and mechanic may be made in the apparatus without in any wise affecting the general scheme of our process.

Assuming that the general character of the apparatus employed is on the order of that illustrated, and that we are treating and reducing an oxid ore of copper, the operation of the invention will be substantially as follows: The copper may be in the form of $CuO$ or $Cu_2O$, or combined with $CO_2$ or $SiO_2$ or other chemical radical. For our present purpose, and to simplify the reactions, let us assume that it is a mixture of $CuO$ and $Cu_2O$. If the ore is not already in a finely divided condition or powder, it is first so reduced by means of any conventional form of grinding machinery usually employed for pulverizing ores and like material. The finely comminuted ore is placed in the compartment $a$ of the hopper 4, and pulverized coal (or its equivalent) in the compartment $b$, and the screw conveyer 5 (operated from any suitable source of power, not shown) is started. At the same time the air pump F is started and the valve C opened. This will cause the air to be forced through the pipe 15, casing 12, one of the pipes 11 and its stove S, one of the flues 10 and casing 9, the hot air flue 8 and nozzle (or nozzles) 7, the current projecting the ore and fuel into and across the igniting chamber 3 as the materials drop from the down-take 6, the direction of projection being at an angle to the axis of the rotating cylinder 1 as previously described, whereby the particles are caused to impinge against the inner walls of the cylinder, rotation being imparted to the latter from the drive shaft D as well understood in the art. The fines projected from the nozzle (or nozzles) 7 may be ignited through the torch hole O as well understood in the art. Before commencing the smelting operation, the combustion and settling chambers and stoves are gradually brought up to the high temperatures incident to the process by burning a certain quantity of the powdered fuel from the compartment $b$ of the hopper, after which the ore charge from the compartment $a$ may be released (the compartments being provided with cut-off gates $m$, $m'$, respectively for controlling the quantity and rate of discharge of the materials), and together with the fuel be projected across the igniting chamber 3 into the combustion chamber or cylinder 1. Once the members 3, 1, 14, S, S, are brought to a high heat by the burning of a certain quantity of fuel, the ore charge is readily reduced and smelted by the high temperature of the reducing atmosphere derived from the combustion of the fuel component admitted into the treatment chamber with the charge of oxid (or equivalent reducible compound). The nozzle (or nozzles) 7 projects the ore and fuel particles into the chambers 3 and 1 in the form of a cloud, the dissemination of the cloud being intensified by the rebound of the burning fuel particles and ore as they impinge against the inner walls of the treatment cylinder 1. The reducing action is brought about by using fuel in excess of that required for melting alone, and by regulation of the air supply so as to produce a reducing atmosphere in the furnace. Under those conditions the carbon dioxid resulting from the combustion of the fuel is converted into carbon monoxid by reaction with fresh particles of carbon, thus—

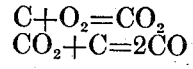
$$C + O_2 = CO_2$$
$$CO_2 + C = 2CO$$

There is thus produced a reducing gas or atmosphere which envelops each particle of the finely comminuted ore or oxid, effecting not only a reduction of the latter, but smelting the resulting metal component of the charge, the reaction being substantially as follows:

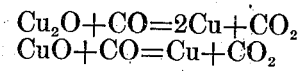
$$Cu_2O + CO = 2Cu + CO_2$$
$$CuO + CO = Cu + CO_2$$

As stated above, if gangue is present (which it usually is where ores are treated) this may be slagged off by introducing into the chamber 3 a suitable flux through the hopper $d$, in which event this would likewise be sprayed against the walls of the cylinder 1, with the ore and reduction fuel. The reduction of the metallic oxids and the fusion of the resulting metal are supposed to be effected in the chamber 3 and cylinder 1, while the particles are still in suspension, although a portion of the reactions by which this reduction and fusion is brought about may take place in the rotating cylinder after the particles have been precipitated, it being remembered that the atmosphere in the chamber of said cylinder is of a highly reducing character, the rotation of the cylinder serving to keep up in a measure, the agitation of the particles so as to prevent their packing, and to insure the envelopment of each unreduced ore particle by a film of the reducing atmosphere referred to. Once an oxid or ore particle is reduced, the metal thereof is fused, flowing down the incline of the cylinder 1 into the settling chamber 14, the surface of the metal being protected by the slag which floats on top of the metal.

If desired, fluxing material of proper character may be delivered into the settling chamber through the hopper 20 so as to maintain a highly fluid slag on top of the charge of fused or molten metal in the chamber, the interior of said chamber being maintained at a proper and sufficient temperature by the heat of combustion of the fuel introduced with the ore charge. As the molten metal and slag accumulate in the chamber 14, they are tapped off at the tap holes $h$, $h'$, respectively. The tangential discharge of the gases from the treatment cylinder 1 into the chamber 14 aid in the settlement of any particles of ore or metal carried into said chamber as heretofore explained.

In the diagrammatic and more or less conventional drawings here shown, we have assumed that the same current projects the ore and fuel conjointly into the furnace; but it must be understood that we are in no wise limited to any specific means or apparatus for introducing the ore, flux or fuel into the treatment chamber. One set of blast nozzles might be used to project the ore, and another set to independently project the fuel. Again, the fuel used might be gas, oil, any suitable fluid hydrocarbon, producer gas, and the like, and we do not wish to be restricted to crushed coal. Again, if a reducing atmosphere is not desired, the air and fuel are so controlled that mere melting or fusion without reduction may be effected, depending on circumstances and conditions; but in all cases the object sought is to envelop each ore particle by a gaseous film at the proper temperature to effect fusion of the particle in a minimum amount of time and in the most economic manner, the spray or cloud method of feeding the charge having the effect of separating the individual particles sufficiently from one another to permit of a free and unobstructed access of the reaction gases to each particle while the latter is still in suspension in the treatment chamber.

Having described our invention, what we claim is:

1. In the treatment of metallic oxids, the process of spraying a charge of the oxids in a finely divided state into a treatment chamber, surrounding the particles while in the chamber with a gaseous reducing medium, maintaining the temperature of the mixture in the chamber to effect a reduction of the oxids and a smelting of the metallic constituents of the charge while still in a finely divided state, precipitating the fused particles, causing the precipitated particles to advance under agitation and in the presence of a reducing medium to a suitable settling chamber, and finally removing the same from said last mentioned chamber.

2. In the treatment of ores or other material, the process of introducing a charge of the ore in a finely divided state into a treatment chamber, enveloping the ore particles while in suspension in said chamber with a heating medium operating to smelt the charge, precipitating the smelted particles to the bottom of said chamber, advancing the precipitated particles while under agitation in the presence of the heating medium to a suitable settling chamber, and finally removing the smelted product from said settling chamber.

3. In the treatment of ore or other material, the process of introducing a charge of ore and flux and reducing fuel in a finely divided state into a suitable treatment chamber, effecting ignition of the fuel in said chamber whereby each particle of ore is enveloped by a hot gaseous medium reacting chemically with the constituents of the ore, maintaining a reducing atmosphere in said chamber at a temperature to effect reduction of the metallic compounds of the ore and fusion of the resulting metal while still in a finely divided state, precipitating the fused particles, conducting under agitation, the fused particles in the presence of the reducing atmosphere to a suitable settling chamber, and finally removing the metals and slag from said settling chamber.

4. In the treatment of metallic oxid ores and other material, the process of spraying a charge of the material in a finely divided state into a treatment chamber, surrounding the particles while in the chamber with a reducing medium, maintaining the temperature of the contents of the chamber at a point to effect a reduction of the oxids and a smelting of the metallic constituents of the charge while still in a finely divided state, precipitating the smelted particles, and causing said precipitated and smelted particles to advance under agitation in the presence of the reducing medium to a suitable point of discharge.

In testimony whereof we affix our signatures in the presence of two witnesses.

JOHN H. KLEPINGER.
MILO W. KREJČI.
CHARLES R. KUZELL.

Witnesses:
  M. A. Pestana,
  T. P. Corcoran.